July 8, 1952 W. D. BRISCOE 2,602,874
PORTABLE HEATING COVER
Filed Jan. 27, 1950
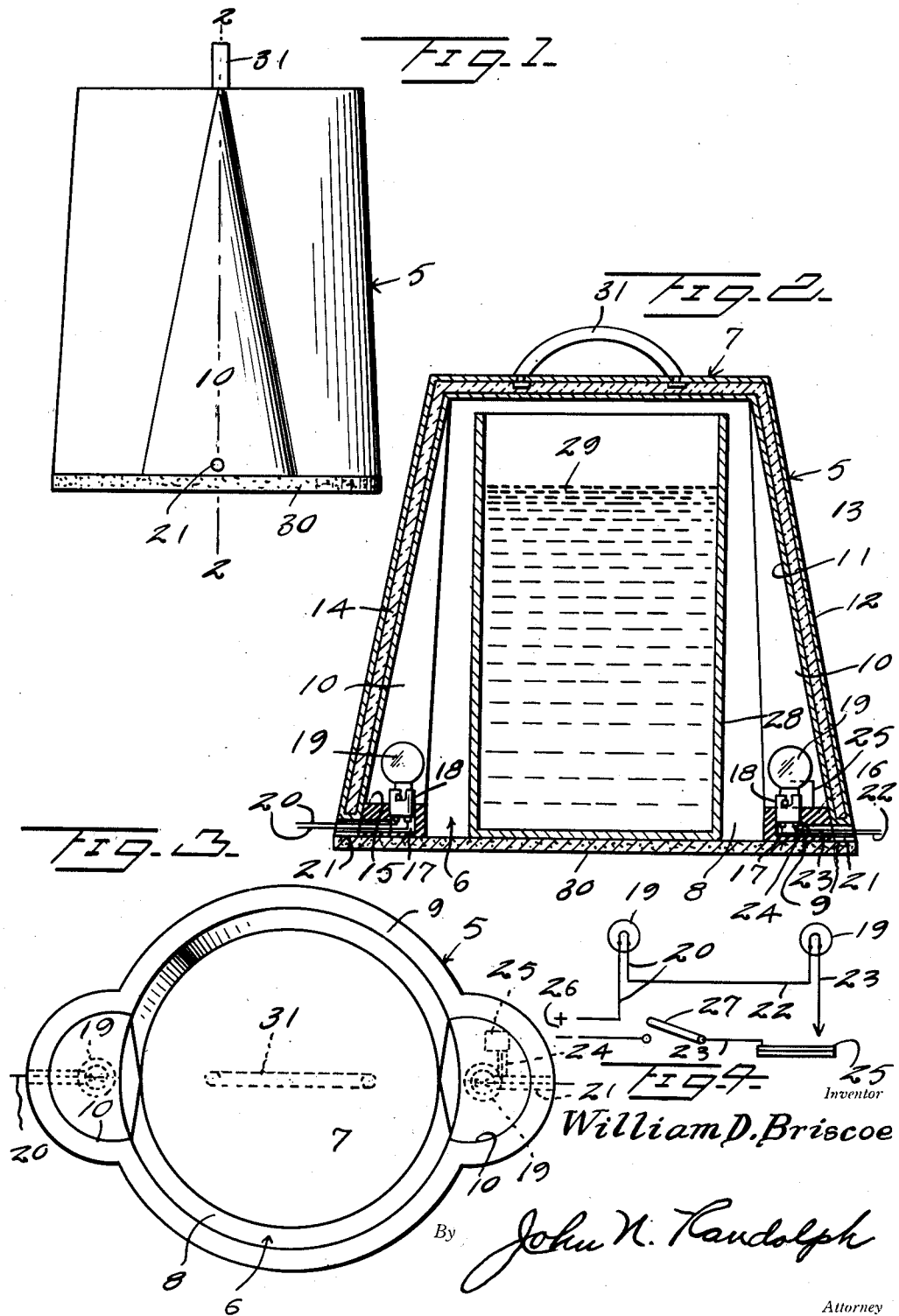
Inventor
William D. Briscoe
By John N. Randolph
Attorney Patented July 8, 1952

2,602,874

UNITED STATES PATENT OFFICE 2,602,874

PORTABLE HEATING COVER

William D. Briscoe, Stevenson, Ala.

Application January 27, 1950, Serial No. 140,884

2 Claims. (Cl. 219—35)

This invention relates to a portable heating cover of extremely simple construction which is primarily adapted for use in heating milk contained in a churn, jar or vessel to sour the milk for churning but which may likewise be used for other purposes such as raising yeast dough.

More particularly, it is an aim of the present invention to provide a heating cover of extremely simple construction having no doors, lids or other moving parts and which is sized to fit conventional butter churns used for home churning and which has no corners, cracks or crevices in which dirt may collect and no parts which come in contact with the milk so that the heating cover may be readily maintained in a clean and sanitary condition.

A further object of the invention is to provide a cover which is light in weight enabling it to be readily handled and which is provided with electric heating means so that the cover may be used by merely plugging it into a conventional electric outlet and is so constructed that a correct and uniform temperature will be maintained thereby for accomplishing the proper souring of milk disposed in a vessel contained within the cover so that a better grade of buttermilk and butter and a greater quantity may be obtained in less time from a given amount of milk and which may be accomplished with a shorter churning time.

Still a further object of the invention is to provide a device which will produce a uniform souring of the milk and which is not accomplished by methods conventionally used in preparing milk for home churning.

Various other objects and advantages of the invention will hereinafter become more fully apparent from the following description of the drawing, illustrating a presently preferred embodiment thereof, and wherein:

Figure 1 is a side elevational view of the cover;

Figure 2 is a vertical sectional view thereof taken substantially along a plane as indicated by the line 2—2 of Figure 1 and showing a milk containing vessel disposed within the cover;

Figure 3 is a top plan view thereof, and

Figure 4 is a diagrammatic view illustrating an electric circuit for the heating cover.

Referring more specifically to the drawing, the portable heating cover in its entirety is designated generally 5 and includes a body, designated generally 6 composed of a top wall 7 and a continuous side wall 8 which tapers slightly from the open lower end 9 of the body 6 toward the top wall 7. Said side wall 8 is provided with two oppositely disposed enlargements 10 of arcuate cross section which are relatively large adjacent the open bottom 9 and which merge with the side wall 8 at the top portion 7, as best illustrated in Figures 1 and 3.

The body 6 is preferably formed of sheet steel or aluminum and includes spaced inner and outer plies 11 and 12, respectively, defining a space 13 therebetween forming a heat insulating chamber which may be left empty or which may be filled with a heat insulating material 14.

A block of electrical insulating material 15 is suitably secured in the lower part of one of the bulge portions 10 and a block 16 of electrical insulating material is secured in the lower, enlarged end of the other bulge portion 10. The blocks 15 and 16 are recessed as seen at 17 to accommodate a portion of a light bulb socket 18 in each of said blocks and which sockets project upwardly into the recesses of the bulge portions 10. A lamp bulb 19 is supported by each lamp socket 18 in a recess defined by one of the bulge portions 10. Electrical conductors 20 extend from the lamp socket 18 of the block 15 through the recess 17 thereof and through an opening 21 of the body 6 and electrical conductors 22 and 23 extend from the lamp socket 18 of the block 16 through the recess 17 of said block 16 and through a complementary opening 21 of the body 6. The conductor 23 has a portion extending through a bore 24 of the block 16 and which connects with a thermostat 25 within the recess of the bulge portion 10, which contains the block 16. As illustrated diagrammatically in Figure 4, one conductor 20 is connected to the conductor 22 and the other conductor 20 and the conductor 23 are adapted to be connected to a conventional male plug, indicated diagrammatically at 26 and which may be plugged into any conventional outlet for energizing the lamp bulbs 19. If desired, a make and break switch 27 may be interposed in the conductor 23.

The heating cover 5 is adapted to be placed over a churn or vessel 28 containing milk, as indicated at 29 to be soured. With the plug 26 connected to an electrical outlet, not shown, the light bulbs 19 will be energized, assuming that the switch 27 is in a closed position, for heating the interior of the cover 5 for heating the churn or vessel 28 and the milk 29 contained therein for effecting a quick uniform souring of the milk. The thermostat 25 preferably functions for breaking the electric to the light bulbs 19 when the temperature within the cover 5 exceeds 70° Fahrenheit and for closing the circuit to the light bulbs when the temperature is below 70° Fahrenheit within the cover 5 so that an accurate heating and souring of the milk will be accomplished. The flat open bottom 9 is adapted to rest on any suitable supporting surface so that the cover 5 will combine therewith to completely enclose the churn or vessel 28 to retain the heat within the cover 5. If desired, the open bottom 9 may be applied over a pad of felt, cocoa matting or other suitable material, as seen at 30. The top 7 is provided with a handle 31 by which the cover 5 may be lifted and carried.

It will be readily apparent that the cover 5 includes no moving parts and with the exception of the light bulbs 19, no parts requiring replacement or maintenance.

Various modifications and changes are contemplated and may obviously be resorted to, without departing from the spirit or scope of the invention as hereinafter defined by the appended claims.

I claim as my invention:

1. A portable heating unit comprising a rigid body member forming a cover of substantially frusto-conical shape having a closed top and an open bottom, said body member having a continuous side wall extending completely therearound including an enlarged lower end defining the open bottom of the cover and a restricted upper end merging with the closed top, said cover being adapted to be disposed over a container to be heated, said top wall and side wall each comprising spaced inner and outer plies of sheet metal defining an enclosed heat insulating space therebetween, heat insulating material filling said space, said side wall having circumferentially spaced externally bulged portions defining internal recessed portions of the cover constituting a part of the chamber defined by the cover, said bulged portions having internally disposed bottom members formed of electrical insulating material closing the bottoms of the internal recessed portions and heating means disposed in said internal recessed portions and secured to and supported by said bottom members.

2. A portable heating unit as in claim 1, and a substantially flat mat formed of a yieldable material of an area at least equal in size to the open lower end of the cover on the central portion of which the container to be heated is adapted to be supported, the enlarged lower end of said side wall resting on said mat for supporting the cover around the container to be heated and for sealing the open lower end of the cover.

WILLIAM D. BRISCOE.

REFERENCES CITED

The following references are of record in the file of this patent:

UNITED STATES PATENTS

| Number | Name | Date |
|---|---|---|
| 1,296,387 | Harris | Mar. 4, 1919 |
| 1,553,175 | Kercher | Sept. 8, 1925 |
| 1,683,740 | Tavender | Sept. 11, 1928 |
| 1,968,015 | Cooke et al. | July 31, 1934 |
| 2,006,059 | Rudorff | June 25, 1935 |
| 2,043,601 | Windemuller | June 9, 1936 |
| 2,511,643 | Lawrence | June 13, 1950 |